United States Patent [19]

Blunschi

[11] Patent Number: 4,593,640
[45] Date of Patent: Jun. 10, 1986

[54] THREE WHEELER MOBILE PONTOONS

[76] Inventor: Paul A. Blunschi, P.O. Box 231, Sicily Island, La. 71368

[21] Appl. No.: 645,272

[22] Filed: Aug. 29, 1984

[51] Int. Cl.[4] ............................................. B63B 43/14
[52] U.S. Cl. ................................... 114/123; 114/270
[58] Field of Search ................. 114/39, 61, 123, 283, 114/292, 270

[56] References Cited

U.S. PATENT DOCUMENTS

| | | | |
|---|---|---|---|
| 3,150,632 | 9/1964 | Evans | 114/123 |
| 3,661,114 | 5/1972 | Wagner et al. | 114/270 |
| 4,494,937 | 1/1985 | Riermann | 114/270 |

FOREIGN PATENT DOCUMENTS

| | | | |
|---|---|---|---|
| 1037899 | 8/1958 | Fed. Rep. of Germany | 114/123 |
| 2350971 | 4/1975 | Fed. Rep. of Germany | 114/270 |
| 2622471 | 11/1977 | Fed. Rep. of Germany | 114/270 |
| 2423357 | 12/1979 | France | 114/270 |

*Primary Examiner*—Sherman D. Basinger
*Assistant Examiner*—Stephen P. Avila
*Attorney, Agent, or Firm*—Keaty & Keaty

[57] ABSTRACT

An improved pontoon system designed for supporting a motorcycle of the three-wheel off-road variety. The pontoons are connected through a pivoting frame to the main motorcycle structure. The position of the pontoons is controlled by a lever arm and handle, secured by locking pins, permitting the pontoons to be positioned in three positions. The first, a fully lowered flotation position, supports a three-wheeler motorcycle on the water to a depth sufficient that the drive wheels of the motorcycle will, through a paddle wheel effect, propel the motorcycle through water. A second, water entry and water exit position, is somewhat higher so that the pontoons will clear small obstacles as the motorcycle enters or leaves the water. A third, overhead terrain traversal position, permits the motorcycle to be driven through rough underbrush and undergrowth and the like while the pontoons are fully clear of any ground obstacles. This three-position pontoon is supported and mounted on a rigid pivoting framework and is lockable in any of the three positions, so as to support essentially the entire weight of the motorcycle plus operator. The design of the pontoons placed the center of flotation of the pontoons sufficiently outboard of the center of gravity of the motorcycle plus operator so that the assemblage is essentially immune to tipping in the water.

7 Claims, 8 Drawing Figures

THREE WHEELER MOBILE PONTOONS

BACKGROUND OF THE INVENTION

Within recent years a growing series of small, single operator, rough terrain vehicles has evolved based on a combination of motorcycle and tricycle technology. These units involve the use of large, low pressure, balloon tires in a tripod pattern, with special off-road traction surfaces for transporting a single operator and some cargo through undeveloped or roadless terrain.

These machines have proven especially popular with hunters, who use them to reach backwood areas and remote rural areas. An extensive market has grown up supporting this type of activity.

Within the bayous of Southern Louisiana and similar coastal regions, a terrain condition arises which inhibits the mobility of an operator on such a device. In essence, the terrain consists of mixed land, marsh and open water area. Any significant mobility in such country requires that the three-wheeler motorcycle have the capability of traversing marsh or open-water area, both of which have insufficient mechanical support to hold the motorcycle up by displacement against the tires. The large, the low pressure balloon-tire design of a three-wheel motorcycle of common off-road design, is such that the motorcycle will operate successfully in areas of heavy mud and other soils having low load-bearing characteristics; the overall weight of the motorcycle plus operator is such that the tires provide insufficient water bouyancy to actually float the motorcycle. Further, were the tires to have sufficient flotation to displace enough water to float the entire motorcycle, the center of gravity of the motorcycle would be sufficiently far above the center of flotation so that the overall unit would be unstable and dangerous to operate.

Various forms of outriggers or pontoons have been designed for off-road vehicles, including both motorcycles and standard four-wheel vehicles. These pontoons suffer a number of disadvantages in rough terrain work.

The principal disadvantage of these prior art designs is that the majority of the prior art pontoons are fixed in position by rigid mechanical braces, being removable only by the removal of bolts, nuts and the like; they cannot be moved between positions while the vehicle is in operation. As a result, a pontoon equipped vehicle is required to have its pontoons permanently extended in a downward floatation position; this requires that the vehicle only be operated in types of terrain where there are few or no obstacles close to the ground and where there is little change in the terrain gradiant or slope. Further, since the pontoons must maintain adequate ground clearance for the vehicle to enter and exit water using traction drive by wheels, the pontoons must be fixed higher than is desirable for optimal flotation.

Thus, if a motorcycle were to have pontoons of standard design, the lower part of the motorcycle, including the operator's foot pedals, a significant portion of the gear casing, the oil pan, and related mechanisms would be permanently immersed in the water. Thus creates a high drag situation when the pontoon equipped motorcycle is actually in the water, inhibits the ability of the motorcycle to be propelled through the water, and creates a permanent discomfort for the operator.

Further, many outrigger designs, in an effort to overcome the necessity of clearing underbrush terrain clearance, do so by locating the pontoons as close as is mechanically practical to the sides of the vehicle attempting to create a narrow vehicle. Locating the pontoons this close to the vehicle creates a very unstable situation as the center of gravity can rapidly be displaced over the center of flotation of the structure as the structure lists. As is known in the art of stability in floating vehicles, this can create a catastrophic flip. Further, as in the case of all catamarand or dual flotation systems, once the unit turns over, it is unconditionally stable in the upside-down position and cannot normally be recovered from that position by the efforts of the operator.

Further, since the average motorcycle or rough terrain vehicle is a single operator device, such instability can be extremely dangerous as it is entirely conceivable that the operator will be alone when the vehicle flips. This produces a situation in which an operator can be trapped or pinned by a dangerous vehicle in a remote wild area with no hope of rescue and no availability of help.

SUMMARY OF THE INVENTION

The current invention relates to the field of providing flotation capability to an existing three-wheeler off-road rough terrain motorcycle of standard design.

The invention differs from the prior art in that it provides a pontoon system having pontoons extending sufficiently far forward and aft along a motorcycle longitudinal axis and being separated by a sufficient distance horizontally during flotation usage that the unit is essentially unconditionally stable during flotation. That is, there is no combination of operator location, as typical operator weights of 200–400 pounds that will produce a situation where the motorcycle can be upset. As will be seen from the detailed description of the preferred embodiment, the lever arm that can be created by proper positioning of the pontoons with respect to the center of gravity of such a three-wheel motorcycle is sufficiently great that the operator is incapable of flipping the motorcycle.

The apparatus permits the pontoons to be placed in such an optimal position for water travel by providing the capability of moving the pontoons, in transit, from an operator's position to two flotation positions.

The first position is optimized for entering and exiting the water. In use of a motorcycle in a water-land transition phase, it is desirable that the wheels be immersed deep enough that some traction exists as the motorcycle begins to leave the water, increasing to a full tractive support by the wheels as the motorcycle reaches the land. Likewise, during a water-entry, it is desirable that the wheels start in a full tractive contact with the land, propelling the motorcycle into the water, and that the wheels gradually are unloaded by pontoon flotation as the motorcycle and its appendages clear the obstacles normally found along the banks of a water body. As this is a transitory position, the temporary immersion of the operator's feet and the lower mechanical portions of the motorcycle are not an inhibiting feature.

Furthermore, lowering of the pontoons creates a second flotation position which raises the motorcycle out of the water a sufficient distance to permit optimum propulsion. This is a minimum drag position, adapted to provide both steerage way and a propulsive capability by using the front and rear tires of the motorcycle respectively as rudders and as rotary paddles.

Inasmuch as the inventive structure is designed to be used in rough terrain areas, a third ground transit position is provided wherein the pontoons are essentially vertically positioned over the operator, in line with the center line of the motorcycle. In this position the pontoon assembly is totally clear of underbrush, undergrowth and the like.

Inasmuch as the pontoons, to be affective as flotation devices, will represent a minor portion of the weight of the overall motorcycle and operator structure, the raising of the pontoons into the vertical position does not significantly affect the center of gravity of of the motorcycle. The motorcycle remains fully maneuverable, mobile, and safe in rough terrain operation over differing slopes, broken terrain, sharp descents, ascents and the like.

Thus it is an object of this invention to provide a motorcycle pontoon system which is capable of supporting a three-wheel motorcycle in rough terrain off-road service in mixed land and water environments.

It is a further object of this invention to provide a pontoon system for a three-wheeler motorcycle which will support the motorcycle in water operation at an optimum depth for propulsion and steerage with minimum drag on the motorcycle and minimum discomfort for the operator.

It is a further object of this invention to provide a pontoon system for a three-wheeler motorcycle for operation in rough terrain and water which provides sufficient stability of the three-wheeler motorcycle while on water to essentially prevent spills, tipovers or instability.

It is a further object of this invention to provide a motorcycle pontoon system that will permit the motorcycle to expeditiously enter and exit the water over rough terrain, steep bank obstacles, and the like.

It is a further object of this invention to provide a motorcycle pontoon system that will permit unimpeded motorcycle operation on rough broken terrain having significant undergrowth and obstacles, or having significant slope differences including step ascents, descents and angle slopes for operation.

It is a further object of this invention to provide a motorcycle pontoon system that will accomplish all of the above objects without requiring the installation of powered takeoffs, power supported systems, or other failure prone operating systems.

Further, it is the object of this invention to provide a pontoon system for all the above purposes which can be moved between various operating positions by a single operator while in use in the field.

These and other objects of the invention are more clearly shown in the detailed description of the preferred embodiment of the invention below.

DETAILED DESCRIPTION OF THE PREFERRED EMBODIMENT

Figure 1:
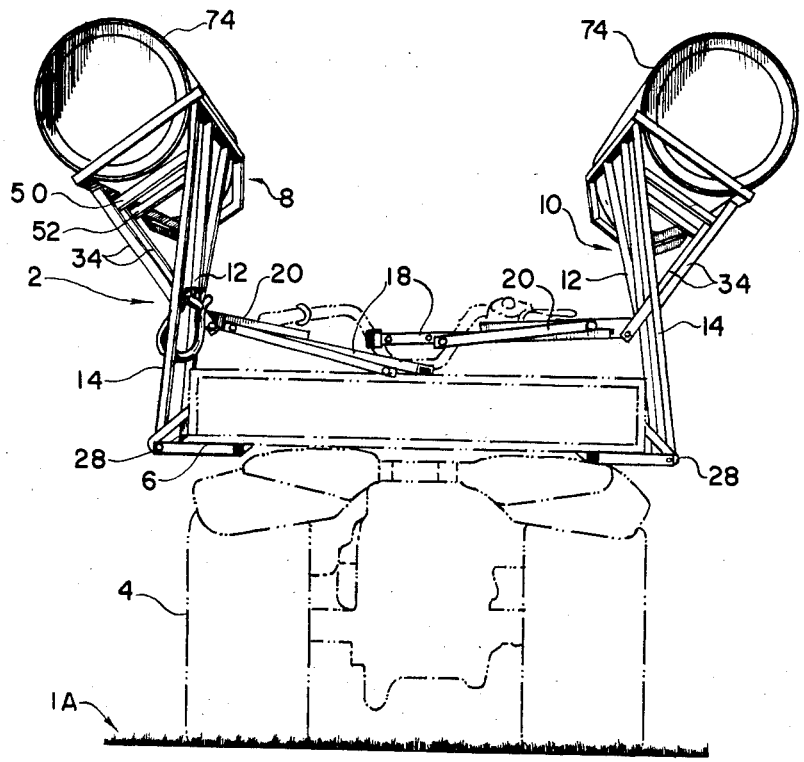
FIG. 1 is a rear view of a first embodiment of the invention in ground travel position.

The figures in combination show an overall pontoon structure 2 of the invention as installed upon a three-wheeler motorcycle 4 of standard design. The pontoon structure 2 is designed to be used on the three-wheeler motorcycle 4, and has specific positions for traversing a ground level 1A, or a water level 1B. In addition, the pontoon structure 2 of the current invention has a third position for transitioning between the ground level 1A and the water level 1B.

The overall pontoon structure 2 of the current invention is affixed to the three-wheeler motorcycle through a framework supporting a backet cross brace means 6, which is installed on existing upper aft structure of the three-wheeler motorcycle 4. The basket cross brace 6 is designed to support and carry various cargo loads and, other than providing an attaching structure for the pontoons 2 of the current invention, the basket cross brace means 6 is not a part of this invention.

The overall pontoon structure 2 comprises a symmetrical left pontoon structure 8 and right pontoon structure 10, which are installed respectively on the left and the right side of the three-wheeler motorcycle. Save for obvious directional differences caused by the mirror-image symmetry of left pontoon structure 8 and the right pontoon structure 10, each of these two structures is identical in construction and function. In the detailed description which follows, only one of the two pontoon structures will be discussed to avoid undue repetition. It is to be understood that the discussion, in fact, describes both structures, each of which is to be constructed as a mirror-image of the other.

In general form the pontoon structures of the instant invention comprises two main angular brace means connecting the inventions to the basket cross brace means 6 upon the three-wheeler motorcycle 4. These are, respectively, a fore angle positioning brace structure 12 and an aft angle positioning brace structure 14. Each of the fore and aft structures 12 and 14 are pivotally connected, adjacent to its point of installation on the basket cross brace means 6, in a manner to be hereinafter described. Each is connected at its lower end fixedly to an overall pontoon support assembly 16. The pontoon support assembly 16 is a fore and aft extending framework which serves the purpose both of supporting pontoon float means as hereinafter described and of rigidly positioning the pontoon float means with respect to the brace structures 12 and 14.

The fixed connection of the brace structures 12 and 14 to the pontoon support assembly, as for all non-pivoting joints in the preferred embodiment in the instant invention, are by welding. In addition, unless otherwise stated, the primary structural members from which the overall pontoon structure 2 is constructed are, in the preferred invention, medium wall thickness, mild steel, hollow tubing. This material was chosen because of its ease of forming and welding and because of its adaptability to the relatively large number of angled joints which will be seen to occur throughout this designed invention.

As stated, both the fore angled positioning brace structure 12 and the aft angled positioning brace structure 14 are pivotally connected to a point adjacent the connection of the brace structures to the basket cross brace means 6. This pivoting connection is the primary pivoting point for positioning the overall pontoon structures 8 and 10 with respect to the three-wheeler motorcycle 4. Motion between the various positions of the invention is controlled by an extendable positioning means on the fore angled positioning brace 12.

This positioning means includes, in a first embodiment of the invention, upper lever arm handle 18. Upper lever arm handle 18 is provided with a convenient hand grasp at a first end, adapted to a position convenient to the grasp of an operator seated upon the motorcycle 4.

Handle 18 extends outwardly to a second end, coupled at said second end to a pivoting connection at upper eccentric lever lower pivot point 24 at which it connects to upper eccentric lever arm 20. Upper eccentric lever 20 is pivotally connected to the pontoon cross brace means 6 at upper eccentric lever upper pivot point 22.

Upper lever arm handle 18 extends a distance beyond upper eccentric lever lower pivot point 24 to interconnect with a lower eccentric lever arm segment 26 at lower positioning cross link pivot point 32. Lower eccentric lever arm segment 26 is an extension or upper segment of fore angled positioning brace structure 12, and connects fore angled positioning brace structure 12 to cross brace means 6 at a lower eccentric lever arm pivot point 28; pivot point 28 is the primary structural connection between the pontoon structures 8 or 10 and the cross brace means 6.

Figure 4:
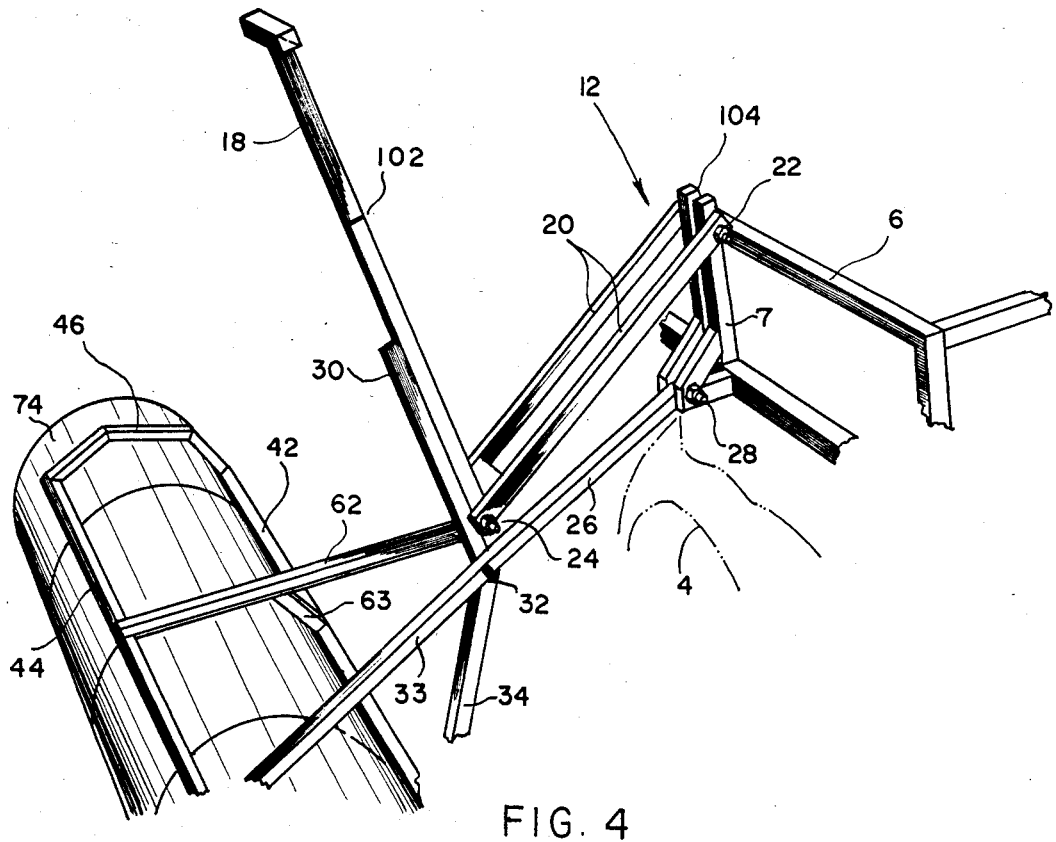
FIG. 4 is an angled detailed view of the pontoon positioning mechanism in a first embodiment of the invention.

As depicted in FIG. 4, lower pivot point 28 and upper pivot point 22 are vertically separated by a cross brace vertical support extension 7, which is a component of the overall basket cross brace means 6. The portion of lever arm 18 extending between upper eccentric lever arm lower pivot point 24 and lower positioning cross link lower pivot 32 defines a segment of upper lever arm handle 18, which is the designated positioning cross link 30.

In this embodiment of the invention, upper eccentric lever upper pivot point 22 is formed by a removable nut and bolt combination through holes provided in upper eccentric lever arm 20 and cross brace vertical support extension 7. It is found in this first embodiment of the invention that upper eccentric lever arm 20 is further best provided as a bifurcated structure, being a symmetrical, split pair of braces, in parallel, connected between pivot points 24 and 22, enclosing thereby cross base vertical support extension 7, and upper lever arm handle 18. This structure is chosen to provide rigidity against vibration and bending in a fore and aft direction.

Figure 3:
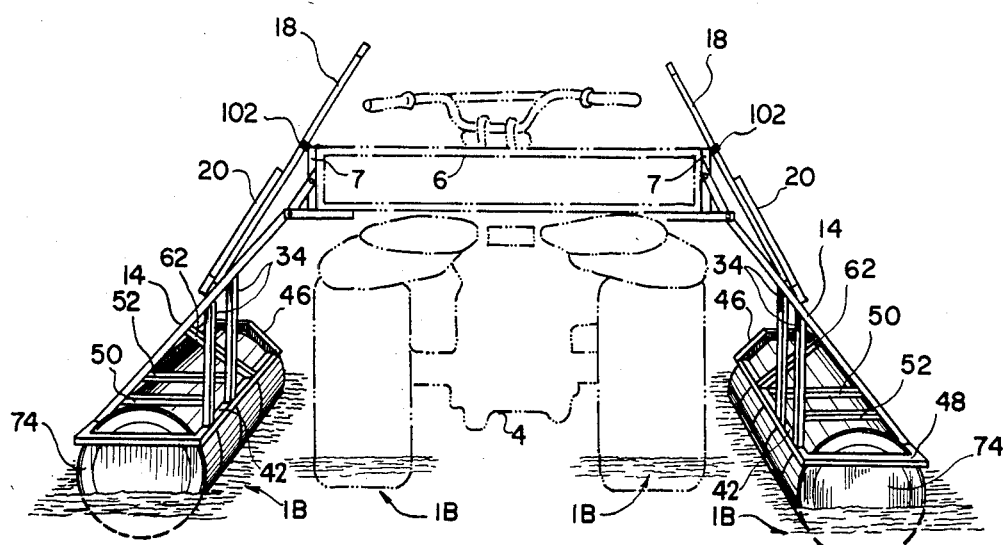
FIG. 3 is rear view of a first embodiment of the invention in a water travel position.

At a position where handle 18 is rotated about pivot 24 so as to be substantially parallel to arm 20, the combination of arm 20 extending through point 24 along cross link 30 defines an essentially straight line, comprising one side of a triangle formed with apexes at pivoting point 32, pivoting 28 and pivoting point 22. The sides of this triangle are in combination arm 20 and link 30, that portion of arm 26 extending between pivot point 32 and pivot point 28, and vertical support extension 7. The relative lengths of the three legs of the said triangle are chosen to define an overall downward angle for left pontoon structure 8 with respect to cross brace means 6. As depicted in FIG. 3, cross means 6 defines an essentially horizontal plane positioned somewhat above the upper wheel structure of the rear wheels of the overall tri-motorcycle 4. The overall downward angle so defined and the resulting positioning of left pontoon structure 8 are hereinafter referred to as the floating or water-travel position for the pontoon structure 8.

In the preferred embodiment of the invention, upper level arm handle 18 is replaced by a telescoping positioner 89. Telescoping positioner 89 is seen to further comprise a positioning crank 90 adapted for rotation by turning of a positioning crank handle 92. The rotation of positioning crank 90 turns a positioning crank threaded arm 94, installed within a positioning crank outer telescoping tube 96 and a positioning crank inner telescoping tube 98. The rotation of positioning crank threaded arm 94 reciprocally in one of two directions serves to, by means of threaded engaging means within inner telescoping tube 98 (not shown), move inner telescoping tube 98 with respect to outer telescoping tube 96 so as to lengthen or shorten the overall telescoping positioner 89 formed by positioning crank outer telescoping tube 96 and inner telescoping tube 98. An upper end of outer telescoping tube 96 is pivotally connected to upper eccentric lever upper pivot point 22; a lower end of inner telescoping tube 98 is pivotally connected to upper eccentric lever lower pivot point 24.

In this particular embodiment, the structure represented in the first embodiment described above by forward positioning cross link 30 is a separate, alternate forward positioning cross link 99 extending from lower pivot point 24 to a rigid, welded connection with fore angle positioning brace structure 12 at a point corresponding to the location of lower positioning cross link lower pivot 32.

Alternate forward positioning cross link 99 defines essentially a perpendicular extension with respect to lower eccentric lever arm assembly 26 at that point corresponding to lower positioning cross link lower pivot 32. In combination, forward positioning cross link 99 and lower eccentric lever arm assembly 26 define substantially a right angle.

In combination, forward positioning cross link 99, a line defined by lower eccentric lever arm assembly 26, extending throughout lower eccentric lever arm pivot point 28 along an imaginary line of extension inward to a point of contact 28a with cross brace vertical support extension 7; a line defined as that portion of cross brace vertical support extension 7 between the point of contact 28A and upper eccentric lever upper pivot point 22 and telescoping positioner 89 together define a trapezoidal structure, the orientation of which is controlled by the overall length of telescoping positioning 89, which in turn is determined by the relative position of inner telescoping tube 98 with respect to outer telescoping tube 96. This is controlled by the rotation of threaded arm 94 by manipulation of positioning crank 90.

At a point of maximum extension of telescoping positioning 89, the structure defines a downward angle for the fore angled positioning brace structure 12 which thereby defines a position of the overall pontoon structure 2 with respect to the three-wheeler motorcycle 4. This position is the position referred to above as the floating or water travel position.

Each of the fore angled positioning brace structure 12 and the aft angled positioning brace structures 14 comprise an angled positioning support 33. An inward section of positioning support 33 between cross link lower pivot 32 and lower arm pivot point 28 has been previously described as lower eccentric lever arm assembly 26. The overall angle of positioning support 33 is defined by the angle of the positioning brace structures 12 and 14, and in turn defines the position of the overall pontoon structure 2 with respect to the three-wheeler motorcycle 4. In the first embodiment of the invention, positioning support 33 extends connectedly to pontoon outboard longitudinal beam assembly 44. An inner vertical support 34 extends from a point adjacent cross link lower pivot 32 and is fixedly connected to pontoon inboard longitudinal beam assembly 42.

Each of forward positioning brace structure 12 and aft positioning brace structure 14 are thereby connected to pontoon inboard longitudinal beam assembly 42 and pontoon outboard beam assembly 44, thereby fixing and orienting pontoon longitudinal beam assemblies 42 and 44 in a fore and aft direction.

At a forward extension of pontoon beam assembly 42 and pontoon beam assembly 44 is found a pontoon nose cross piece 46. In this first embodiment of the invention, pontoon nose cross piece 46 is a curved, saddle-shaped member for vertically enclosing drum pontoon structure 74. At the rearmost extension of pontoon inboard longitudinal beam assembly 42 and pontoon outboard longitudinal beam assembly 44 is found pontoon aft cross piece 48 adapted for enclosing drum pontoon structure 74. Aft cross piece 48 encloses the rear of drum pontoon structure 74 against rearward forces on drum pontoon structure 74 which result from the drag encountered when drum pontoon section 74 is moved forward through water.

On the forward positioning brace structure 12 at a point adjacent to the drum pontoon structure 74, connecting between a lower position on angled positioning support 33 and on vertical support 34, is found forward lateral brace 52. In an analogous manner on aft brace structure 14, adjacent drum pontoon structure 74, interconnecting a lower position on positioning support 33 and on vertical support 34, is found aft lateral brace 50.

Connected extendingly from forward angled positioning brace structure 12 positioning support 33, at a midpoint on positioning support 33, is forward angled support brace 62. Angled support brace 62 extends at an angle from its point of connection to positioning support 33 to a point approximating a forward third of outboard longitudinal beam assembly 44. A second forward angled support brace 63 bracingly extends from a midpoint of forward angled support brace 62 to a point approximating a forward third of inboard longitudinal beam assembly 42.

Within the first embodiment of the invention, the overall structure defined by the pontoon longitudinal beam assemblies 42 and 44, the nose cross piece 46, the aft cross piece 48, the angle positioning support 33, the vertical support 34, the forward lateral brace 52, the aft lateral brace 50, the forward angle support brace 62 and the forward second angled support brace 63, is a framework within which is positioned drum pontoon structure 74. Drum pontoon structure 74 is an essentially buoyant, cylindrical structural. It is comprised of a series of interconnected sealed 5 gallon metal drums, providing thereby an air filled float. The overall drum pontoon structure 74 is affixed to the above mentioned structure by periodic interconnection of straps (not shown) encircling the drum pontoon structure 74 and connected fixedly from the inboard longitudinal beam assembly 42 to the outboard longitudinal beam assembly 44. The fore angle positioning brace structure 12 as described, including the forward angled support 62 and 63, together with the aft angle positioning brace structure 14, rigidly position the overall drum pontoon structure 74 both up and down and fore and aft with respect to the basket cross base means 6; this defines the overall position of the drum pontoon structure 74 with respect to the three-wheeler motorcycle 4.

In the preferred embodiment of the invention, the pontoon structure 2 differs from the structure having the drum pontoon structure 74 in the following particulars.

Figure 5:
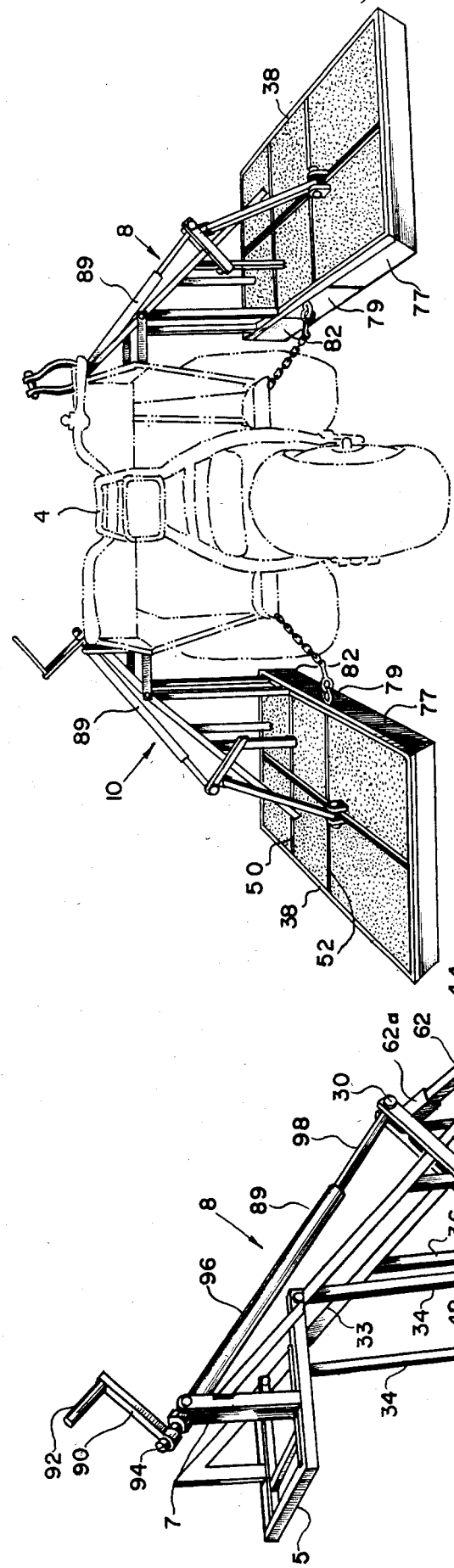
FIG. 5 is a front view of the preferred embodiment of the invention.
Figure 6:
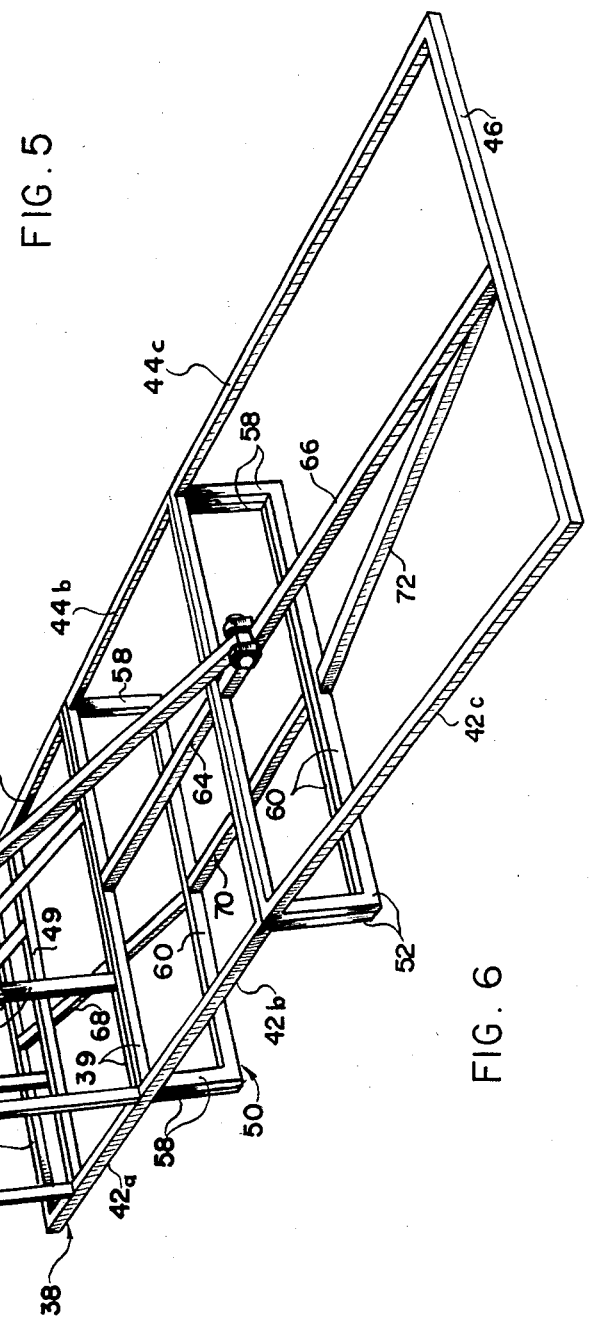
FIG. 6 is a angled view of the preferred embodiment of the invention, with the prior art tri motorcycle and the flotation members removed for clarity.
Figure 8:
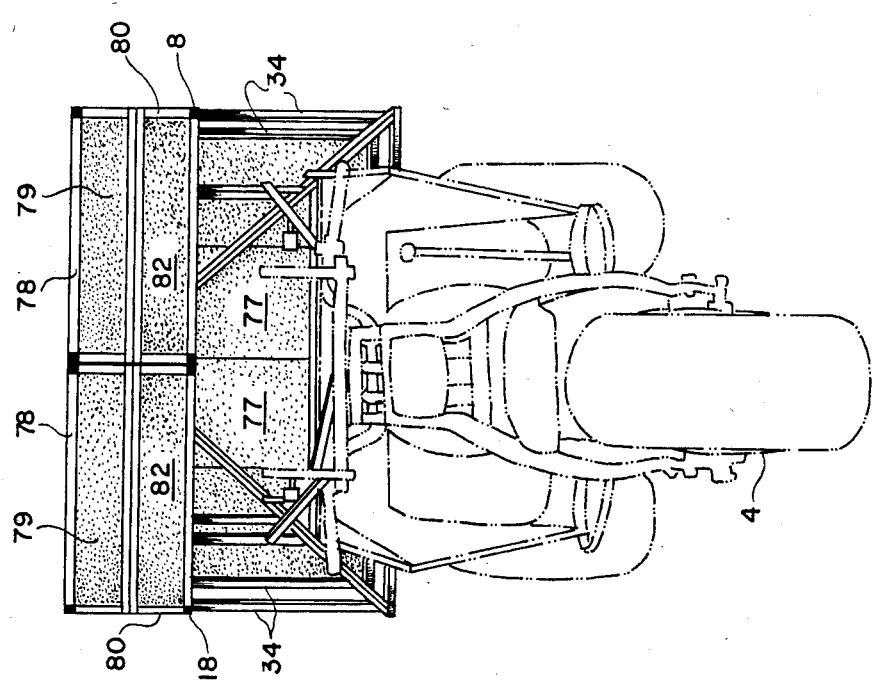
FIG. 8 is a frontal view of the preferred embodiment of the invention in the ground travel position.
Figure 7:
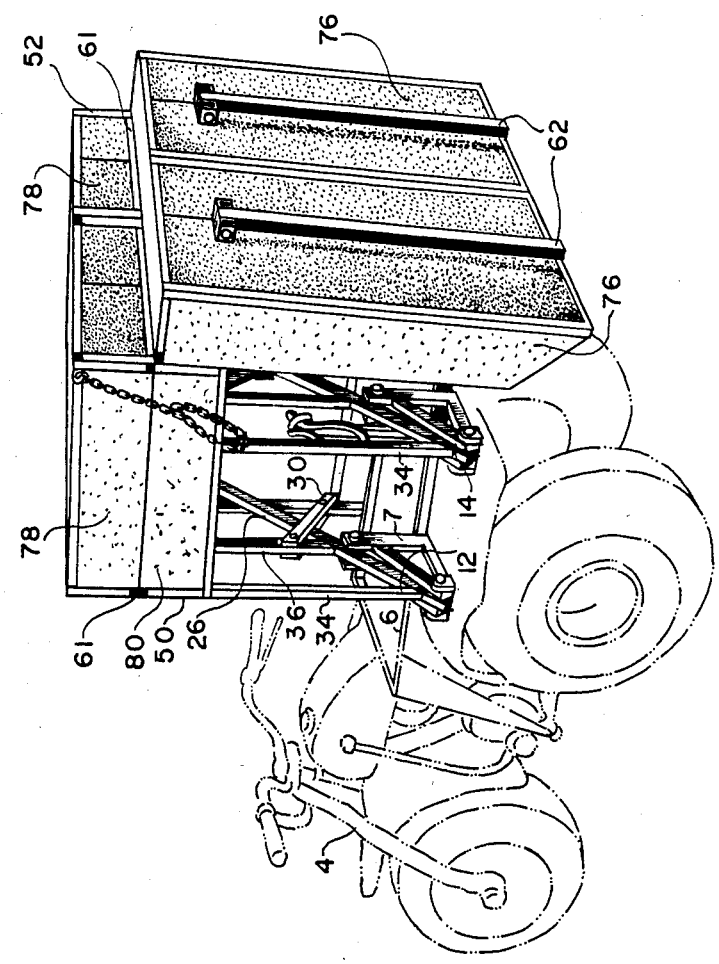
FIG. 7 is a view of the preferred embodiment of the invention in the ground travel position.

Referring to FIG. 5 and the subsequent figures, again each of the left pontoon structure 8 and the right pontoon structure 10 are seen to be mirror-image symmetrical. This description is restricted to one such pontoon structure for clarity.

The figures depict a structure which has a forward angled positioning brace structure 12 and an aft angled positioning brace structure 14. Each of the brace structure 12 and brace structure 14 in turn have an angled positioning support 33, extending from lower eccentric lever arm pivot point 28 outward to a point of rigid interconnection with an overall pontoon support structure 38. An inner vertical support 34 is provided from a fixed connection to positioning support 33 at a point adjacent arm pivot point 28, extending to a rigid interconnection with pontoon support structure 38 at a point adjacent pontoon inboard longitudinal beam assembly 42. A mid vertical support 36 is provided, extending from angled positioning support 33 at a point adjacent a mid point of angled positioning support 33, extending down to and rigidly connected to pontoon support structure 38.

Pontoon support structure 38 in detail includes pontoon inboard longitudinal beam assembly 42 and pontoon outboard longitudinal beam assembly 44, which define thereby fore and aft extending inner and outer edges to the pontoon structure 38. At a line defined by the forward ends of inboard longitudinal beam assembly 42 and outboard longitudinal beam assembly 44 is found pontoon nose cross piece 46, defining the front of the pontoon support structure 38. Likewise, at a line defined by the rear ends of pontoon inboard beam assembly 42 and pontoon outboard beam assembly 44 is found pontoon aft cross piece 48, defining thereby at aft end to the pontoon support structure 38.

Aft angled positioning brace structure 14, comprising an angled positioning support 33, an inner vertical support 34, and a mid vertical support 36, interconnect with and is linked to pontoon support structure 38 by rigid interconnection to rear pontoon lateral support 49.

Fore angle positioning brace structure 12, comprising an angled positioning support 33, an inner vertical support 34, and a mid vertical support 36, positioned parallel to aft angle position brace structure 14, is rigidly interconnected to pontoon support structure 38 by rigid interconnection to an aft lateral hinge brace assembly 50.

Inasmuch as the entire positioning brace structure comprising fore aft positioning brace structure 12 and aft angle positioning brace structure 14 are directly connected to basket cross brace means 6, and inasmuch as basket cross brace means 6 are located immediately behind the position of a rider on motorcycle 4, the aft lateral hinge brace assembly 50 is located at a position longitudinally somewhat behind the position of the rider on a motorcycle 4.

The position of aft lateral hinge brace assembly 50 with respect to pontoon aft brace 48 defines a segment of the overall pontoon support structure corresponding to an aft rectangular pontoon float 80. At a distance forward along pontoon support structure 38 from the position of aft pontoon lateral hinge brace assembly 50, said distance being substantially equal to the distance between pontoon aft cross piece 48 and aft lateral hinge brace assembly 50, is found mid lateral hinge brace assembly 52. That portion of pontoon support structure 38 between the aft lateral hinge brace assembly 50 and the mid lateral hinge brace assembly 52 comprises and defines a location for a mid rectangular pontoon float 78. The remaining portion of the pontoon support structure forward of the mid lateral hinge brace assembly 52, is a single structure extending from the mid lateral hinge brace assembly 52 to the pontoon nose cross piece 46, comprising and defining a forward rectangular pontoon float 76. The relative lengths of the forward rectangular pontoon 76, the mid rectangular pontoon float 78, and the aft rectangular pontoon float 80 are such that the aft rectangular pontoon float 80 and the mid rectangular pontoon float 78 are substantially the same length and and size; each of the mid and aft pontoon floats 78 and 80 are somewhat smaller than the length of the forward pontoon float 76.

Each of the aft lateral hinge brace assembly 50 and the mid lateral hinge brace assembly 52 are identically constructed. Each comprises two ajoining substantially rectangular frame assemblies each comprised of a first hinge assembly support tube 58 defining one vertical edge, a hinge assembly top cross tube 59 defining a top edge, a second hinge assembly support tube 58 defining a second vertical edge, and a hinge assembly bottom cross tube 60 defining a bottom edge. As is true throughout the entire pontoon structure 2, each of the hinged brace assemblies 50 and 52 are comprised, in the preferred embodiment, of substantially square cross section, hollow metal tube being welded at all fixed points.

At the location of the aft lateral hinge brace assembly 50 and the mid lateral hinge brace assembly 52, pontoon inboard longitudinal beam assembly 42 and pontoon outboard longitudinal beam assembly 44 are split, dividing each of pontoon inboard longitudinal beam assembly 42 and pontoon outboard longitudinal beam assembly 44 into three separate extending sections. Each of the aft lateral hinge brace assembly 50 and the mid lateral hinge brace assembly 52 are comprised of two identical rectangular tube frames, as described above, contactingly ajoining face to face at a point defined by the intersection of a hinge assembly vertical support tube 58 with each of the ends of hinge assembly top cross tube 59. The two assemblies define a rear lateral brace assembly rectangular tube structure 5A and a front lateral brace assembly rectangular tube structure 5B. Likewise, the mid lateral brace assembly 52 in turn comprises a rear rectangular tube assembly 52A and a front rectangular tube assembly 52B.

In turn the three segments of the pontoon inboard longitudinal beam assembly 42 and the pontoon outboard longitudinal beam assembly 44 are fixedly interconnected to opposite corners defined by the ends of the hinge assembly top cross tubes 59. The rear segment of the pontoon inboard longitudinal beam assembly 42A and pontoon outboard longitudinal beam assembly 44A are connected to the aft lateral brace assembly rear rectangular tube 50A. The pontoon inboard longitudinal beam assembly mid segment 42B and pontoon outboard longitudinal beam assembly mid segment 44B are, in an identical manner, connected from the aft lateral brace rectangular tube section 50B to the mid lateral brace rear rectangular tube section 52A. The pontoon inboard longitudinal beam assembly front segment 42C and the pontoon outboard longitudinal beam assembly front segment 44C are connected to and extend forward from the mid lateral brace assembly front rectangular tube section 52B.

As described above, the aft lateral hinge brace assembly 50 and the mid lateral brace assembly 52, together, define three separable sections of the overall pontoon support structure 38. Each of these hinge brace assemblies is connected as follows to create a unitized pontoon support structure 38. The aft lateral hinge brace assembly 50 is joined by abutting, face to face, rear rectangular tube assembly 50A and front rectangular tube assembly 50B so that the hinge assembly vertical support tubes 58, the hinge assembly top cross tubes 59, and the hinge assembly bottom cross tubes 60 are mutually adjoining. A plurality of hinges 61 are then installed along a lower line and joining the hinge assembly bottom cross tube 60 so that the rear rectangular tube assembly 50A and the front rectangular tube 50B can split apart only by rotation about the hinges 61 along the said line along the bottom line of contact of the hinge assembly cross tube 60. In a like manner, mid lateral hinge brace assembly 52 is created by facing together rear rectangular tube assembly 52A and front rectangular tube assembly 52B so that the respective hinge assembly vertical support tubes 58, the hinge assembly top cross tubes 59, and the hinge assembly bottom cross 60 are in facing contact. Again, a plurality of hinges 61 are installed along a line representing the bottom contact line of the hinge assembly bottom cross tube 60 so as to restrict the mid lateral brace hinge assembly 52 to a hinged-opening motion between the rear rectangular tube assembly 52A and the front rectangular tube assembly 52B by pivoting about the hinges 61.

The hinges 61 in the aft lateral hinge brace assembly 50 and the mid lateral brace assembly 52 thus unitize the forward rectangular pontoon float section 76, the mid rectangular pontoon float section 78, and the aft rectangular pontoon float section 80 into the entire pontoon support structure 38.

The pontoon support structure 38 is completed by providing, along a line parallel to the pontoon inboard longitudinal beam assembly 42, intermediate the pontoon inboard longitudinal beam assembly 42 and the pontoon outboard longitudinal beam assembly 44, a fore and aft structure comprising, in combination, the following:

An aft angled keel beam 68 is fixed running from a point intermediate the pontoon aft cross piece 48 to a point intermediate the hinge assembly bottom cross tube 60 of the aft lateral hinge brace assembly rear rectangular tube section 50A. A mid keel beam 70 is fixedly mounted between a point adjacent the mid point of the hinge assembly bottom cross tube 60 of the aft lateral hinge brace assembly front rectangular tube section 50B, extending forward to a point adjacent to mid point of the hinge assembly bottom cross tube 60 of the mid lateral brace assembly rear rectangular tube section 52A. A forward angled keel beam 72 is fixedly mounted from a point adjacent the mid point of the hinge assembly bottom cross tube 60 of the mid lateral brace assembly forward rectangular tube section 52B, running forward to a point adjacent the mid point of the pontoon nose cross piece 46. Adjacent the point at which the pontoon cross piece 46 and the forward end of the forward angled keel beam 72 are fixed is fixedly mounted a forward longitudinal support beam 66 which runs thence aft and fixes to a point adjacent the mid point of the hinge assembly top cross tube 59 of the mid lateral brace hinge assembly front rectangular tube section 52B. A mid longitudinal support beam 64 is fixedly mounted to and extends between a point adjacent the mid point of the hinge assembly top cross tube 59 of the mid lateral hinge brace assembly rear rectangular tube section 52A to a point adjacent the mid point of the hinge assembly top cross tube 59 of the aft lateral hinged brace assembly forward rectangular tube assembly 50B. As stated, all of the mid longitudinal support beam 64, the forward longitudinal support beam 66, the aft angled keel beam 68, the mid keel beam 70, and the forward angled keel beam 72 are parellel to and intermediate the pontoon inboard longitudinal beam assembly 42 and the outboard longitudinal beam assembly 44.

At a point on the forward longitudinal support beam 66, forward of the mid lateral hinged brace assembly 52, is pivotally affixed forward angle support brace 62. Forward angle support brace 62 runs aft and is removably affixed by a compliant joint 62a to forward positioning cross link 99 at a point adjacent upper eccentric lever lower pivot point 24. The compliant joint 62a of forward angle support brace 62 may be connected by any easily disconnected fastening means having a degree of pivoting action; in the preferred embodiment, the joint is provided by inserting a removable push pin connecting a small welded extension located upon the forward positioning cross link 99 with the upper rear end of the forward angle support brace 62.

Within the pontoon support structure 38 is inserted for buoyancy a forward rectangular pontoon float foam section 77. Foam section 77 is a unitized block of lightweight structural foam, not susceptible to waterlogging; styrofoam is used, heavily coated with a urethane to prevent waterlogging, corrosion, bursting or melting. It is shaped to fit within the structure defined by forward angle keel beam 72, forward longitudinal support beam 66, pontoon inboard longitudinal beam assembly foward section 42C, pontoon outboard longitudinal beam assembly forward section 44C, mid lateral hinged brace assembly forward rectangular tube section 52B.

In an analogous manner, mid rectangular pontoon float foam section 79 is retained within the structure comprising mid keel beam 70, pontoon outboard longitudinal beam assembly mid segment 44B, mid longitudinal support beam 64, pontoon inboard longitudinal beam assembly mid segment 42B, mid lateral hinge brace assembly rear rectangular tube section 52A, and aft lateral hinge brace assembly front rectangular tube section 50B.

In the same manner, aft rectangular float foam section 80 is enclosed within the structure comprising the aft angled keel beam 68, pontoon inboard longitudinal beam assembly rear segment 42A, rear pontoon lateral support 49, the pontoon outboard longitudinal beam assembly rear segment 44A, and aft lateral hinged brace assembly rear rectangular section 50A.

In operation, the pontoon structure 2 is made operational either as an existing rigid drum pontoon structure 74 or, in the preferred embodiment, by connecting the forward angled support brace 62 at its removable joint 62A. This causes the forward angle support brace 62 to lock the pontoon support structure 38 against the opening either the aft lateral hinge brace assembly 50 or the mid lateral hinge brace assembly 52, creating a unitized elongate pontoon structure containing therein the foam pontoon sections 77, 79 and 82 for buoyancy.

When the motorcycle 4 is in a position to enter the water, with the pontoon assembly 2 of the first embodiment, the upper lever arm handle 18 is unlocked and thrown substantially outward, which motion draws together the upper eccentric lever upper pivot point 22 and the upper eccentric lever lower pivot point 24, thus raising the pontoon structures 8 and 10 so that the drum pontoon structure 74 is at a second, slightly higher position.

Figure 2:
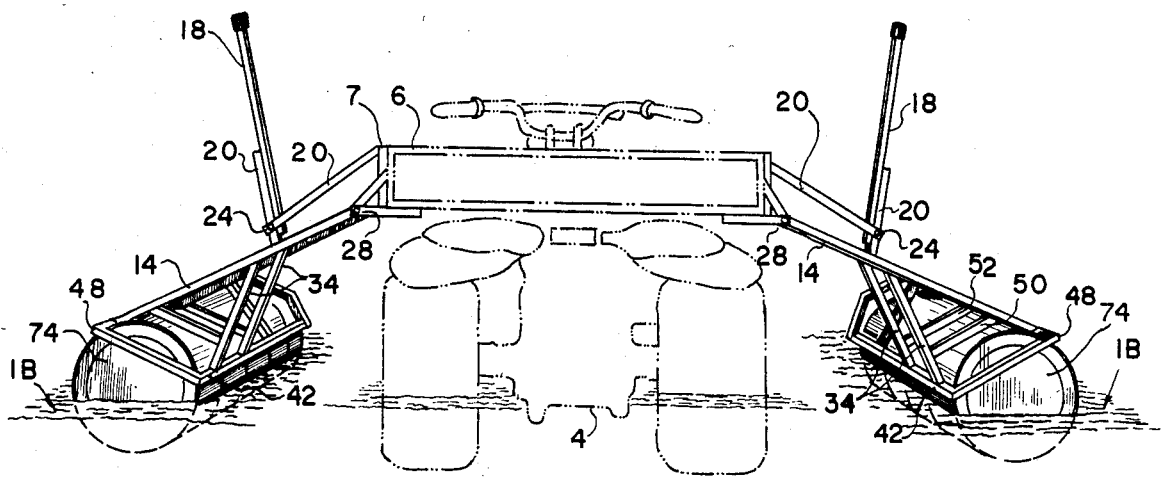
FIG. 2 is a rear view of a first embodiment of the invention in a water entry position.

In the preferred embodiment, the positioning crank handle 92 is manipulated so as to, by rotation of the crank threaded arm 94, retract the inner telescoping tube 98 a distance into the outer telescoping tube 96 and thus, by corresponding retraction of the forward positioning cross link 99, raise the pontoon support structure 38 to a second slightly higher position. As shown most specifically in FIG. 2, said slightly higher position causes the pontoons to be essentially above the line defined by the lower edge of the wheels of the three-wheeler motorcycle 4, and thus to have a degree of clearance over ground terrain. In this position, the operator on the three-wheeler motorcycle 4 can enter the water with the assurance that his pontoon structure 2 will be clear of the small obstacles, stumps and the like which are often found at banks or bodies of water.

Once the three-wheeler motorcycle 4 has fully entered the water, will be found that the buoyancy of the drum pontoon structure 74 or, in the preferred embodiment, the foam float sections 77, 79, 82 encased within the pontoon structure 38, provide sufficient buoyancy and that the operator, the motorcycle 4 and the pontoon structure 2 are all maintained in a floating position. Since the pontoon structure 2 is in the second, higher position, the wheels and bottom of the three-wheeler motorcycle 4 are substantially submerged, providing high drag, and immersing certain of the moving parts. At this point, therefore, to optimize the travel capability of the overall pontoon structure 2 and three-wheeler motorcycle 4, the pontoon structure 2 is lowered to a first, lowest, water travel position as follows.

In the initial embodiment, the lever arm 18 is pulled by the operator inward and downward position, thereby lining up lever arm down lock hole 102 and lever arm lock down 104 holes within the cross brace vertically support extension 7. A push pin or other suitable removable locking device is then inserted through lever arm lock down 104 and lever arm lock down hole 102, locking lever arm 18 into the downward position. As was described, the resulting structure formed by upper lever arm handle 18, lower eccentric lever arm assembly 26, and cross brace vertical extension 7, moves the forward angled positioning brace structure 12 into a substantial downward angle establishing a lowest position for the drum pontoon structure 74.

In the preferred embodiment of the invention, positioning crank handle 92 is manipulated so as to rotate crank threaded arm 94 extending inner telescoping tube 98 a distance out of outer telescoping tube 96, thereby exerting a force against forward positioning cross link 99 forcing downward the fore angled positioning of brace structure 12 and thereby lowering the pontoon support structure 38.

In either case, the pontoon floating portion, that is the drum pontoon structure 74 or the foam pontoon sections 77, 79, 82, are moved to a lowest position essentially coplanar with the level of the wheels of the three-wheeler motorcycle 4. The buoyant effect of the pontoons thus raises the three-wheeler motorcycle 4 so that only the lower surface of the wheels of the three-wheeler motorcycle 4 are immersed in water. It is found that in this position, three-wheeler motorcycle 4, which, as is known in the art, is equipped with high drag, relatively buoyant tires, has sufficient tire structure immersed in the water to provide both a propulsion effect, similar to a paddle wheel, and a steering effect through the rudder-like action of the front tire. Substantially all the remaining structure is removed from the water, reducing drag and placing the operator in a comfortable, dry operating position.

It has been found that the essentially outward placement of each of the left pontoon structure 8 and the right pontoon structure 10 in combination provide a wide stable base and that in practice the entire structure cannot be tipped over, even if the operator were to stand on one of the pontoon support structures 38. The entire assemblage is substantially stable in the water, providing an excellent combination of stability, safety, manuverability, and comfort.

When it is desired by the operator to remove the three-wheeler motorcycle 4 from water, the "entering the water" procedure stated above is reversed, raising the pontoons to the second, higher position permitting the wheels to descend beneath the level of the pontoons so that they might grip the ground terrain and permit the motorcycle to be driven in a standard manner, from the water onto land.

At this point the pontoon structure is placed into the ground travel position as follows.

In the first embodiment of the invention, the lever arm 18 is unlocked by removing the latching means between the lever arm lock down hole 102 and the lever arm lock down 104 permitting the lever arm 18 to swing free. A substantial pull upon the upper lever arm 18, which is at that point unconnected, permits the entire forward positioning brace structure 12 to be raised to a essentially vertical position, causing the left pontoon structure 8 and the right pontoon structure 10 to be raised to a vertical position over and within the overall wheel base of the motorcycle 4.

In the initial embodiment the lever arms 18 are then tied down by rope, shock cords or the like to the basket cross brace means 6. In addition, it is found that a provided up lock hole 106, located on angled positioning support 33, can be aligned with lever arm lock down hole 14 permitting the removable push pin or similar means for locking down lever arm 18, to be reinserted, locking angled positioning support 33 in an essentially vertical position, connected through lever arm lock down 104 to cross base vertical support extension 7. This locks the overall left pontoon structure 8 and right pontoon structure 10 over the top of the motorcycle 4 in a position well clear of any undergrowth suitable for ground travel.

Likewise in the preferred embodiment of the invention, the telescopic positioner 89, which, in a manner analagous to the lever arm 18, is removably fixed to cross brace vertical support extension 7 by removable fastening means through lever arm lock down 104, is released permitting brace structures 12 and 14 to be moved to an essentially vertical position, so that pontoon support structure 38 is raised over the top of motorcycle 4. Again, provided locking hole 106 in angled positioning support 33 is positioned such that it may be locked by the removable locking means through lever arm lock down 104, locking each of left pontoon structure 8 and right pontoon structure 10 in a vertical position.

At this point, forward angled support brace 62 is disconnected at removable joint 62A, permitting aft lateral hinge brace assembly 50 and mid lateral hinge brace assembly 52 to be rotated about their respective hinges 61. Thus, after rectangular pontoon float 80 is positioned vertically above basket cross brace means 6, by opening aft lateral hinged brace assembly 50 about the hinges 61, mid rectangular pontoon float 78 is folded contactingly onto and immediately above aft rectangular pontoon float 80. Mid lateral hinge brace assembly 52 is then opened along its hinges 61 causing forward rectangular pontoon float 76 to fold into a vertically downward extending position which is immediately behind the mid rectangular pontoon float 78 and aft rectangular pontoon float 80, extending downward behind basket cross brace means 6 on three-wheeler motorcycle 4.

In this preferred embodiment, the pontoon floats 76, 78 and 80 are secured by any ready fastening means, rope, tie-down chain, shock cords, or the like. The structure provides a folded, extremely compact cross-section behind the position of the operator of the three-wheeler motorcycle 4; it is especially suitable for cross-country travel. It is found that when pontoon structure 2 is constructed to achieve the proper depth of the pontoons for the first, lowest water flotation position mentioned above, that the folded position of the aft rectangular pontoon float 80 and the mid rectangular pontoon float 78 will occur at a point below the level of the head of the average operator of a three-wheeler motorcycle 4. As a result, three-wheeler motorcycle 4 in the ground travel position has substantially the same vertical, overhead obstacle clearance as three-wheeler motorcycle 4 would have were it to have no pontoon structure 2 installed at all.

Thus it can be seen that the described novel pontoon structure for a three-wheeler motorcycle provides in combination an enhanced capability for entering and leaving the water over obstacle terrain; an improved position for water travel optimized for stability, operator comfort, and best performance of a motorcycle in the water; and a significantly improved ground transit capability over prior art pontoon structures.

It can thus be seen from the two embodiments herein described that the invention is capable of many mechanical variations, while preserving the essential capabilities of the invention; thus the invention should be restricted not to the particular embodiments described above but to those equivalents inherent in the claims.

I claim:

1. A flotation structure for adapting a three-wheel motorcycle to travel upon water and stabilizing its position during water travel, comprising:
    (a) attachment means for supportively mounting said flotation structure to an aft frame of the motorcycle;
    (b) a first and second flotation support means, pivotally connected to said attachment means, extending laterally from a first side of said attachment means and adapted to be hand-operated between a first, uppermost position, a third lowermost position and a second intermediate position, wherein each of said flotation support means further comprises:

(i) an upper eccentric lever arm pivotally connected, at one end, to said attachment means;

(ii) a lower eccentric lever arm pivotally connected, at one end, to said attachment means a distance below said upper eccentric lever arm;

(iii) a forward angle support brace pivotally connected to the lower eccentric lever arm at one end, and fixedly attached at the second end to the buoyancy means;

(iv) an aft angle support brace pivotally connected at one end to the attachment means and fixedly attached at the second end to the buoyancy means;

(v) a handle means pivotally connected to the second end of the upper eccentric lever arm, the handle means being adapted to be hand-operated to effect change of positions of the flotation support means;

(c) buoyancy means, fixedly attached to each of said support means, adapted to floatingly displace the weight of said motorcycle;

(d) locking means for locking each of said flotation support means in each of said first, second and third positions.

2. The apparatus of claim 1, wherein the upper eccentric lever arm is bifurcated and the handle means is mounted between its tines.

3. The apparatus of claim 2, wherein said locking means comprises a vertical support extension means fixedly attached to the attachment means and extending between said upper and lower eccentric lever arms, said vertical support extension means being provided with an aperture to receive a locking pin after the handle means aperture has been aligned with a corresponding aperture of the handle means.

4. The apparatus of claim 3, wherein the handle means is provided with spaced apertures to facilitate locking of the handle means in various positions in relation to the vertical support extension means.

5. A flotation structure for adapting a three wheeled motorcycle to travel upon water and stabilizing its position during water travel, comprising:

(a) attachment means for supportively mounting said flotation structure to an aft frame of the motorcycle;

(b) a first and second flotation support means, pivotally connected to said attachment means, extending laterally from a first side of said attachment means and adapted to be hand operated between a first, uppermost position, a third lowermost position and a second intermediate position, wheren said flotation support means further comprises:

(i) an upper lever arm pivotally attached, at one end, to said attachment means;

(ii) a lower lever arm pivotally attached, at one end, to said attachment means a distance below said upper lever arm and fixedly attached at the second end to the buoyant means;

(iii) an aft angle support brace pivotally connected, at one end, to the attachment means a distance laterally from said lower lever arm, and fixedly attached at its second end to the buoyancy means;

(iv) a cross link adapted to receive in pivoted relationship the second end of the upper lever arm;

(v) a forward angle support brace pivotally connected at one end to the buoyancy means, and adapted to be selectively pivotally connected to the cross link;

(vi) a crank handle means mounted onto said upper lever arm and adapted to be hand operated to facilitate change of positions of the flotation support means;

(c) buoyancy means fixedly attached to each of said support means, adapted to floatingly displace the weight of said motorcycle;

(d) locking means for locking each of said flotation support means in each of said first, second and third positions.

6. The apparatus of claim 5, wherein said upper lever arm further comprises a pair of telescopically connected tubes, the inner tube being connected to the crank handle means for axial sliding within the outer tube.

7. The apparatus of claim 6 wherein the pontoons in the first position are carried partially behind a seat of the motorcycle.

* * * * *